United States Patent [19]

Umezawa et al.

[11] Patent Number: 5,496,978
[45] Date of Patent: Mar. 5, 1996

[54] AUTO-CANCEL DEVICE

[75] Inventors: Kazunori Umezawa; Kiyoshi Sashida, both of Saitama, Japan

[73] Assignee: Toyo Denso Kabushiki Kaisha, Tokyo, Japan

[21] Appl. No.: 47,027

[22] Filed: Apr. 16, 1993

[30] Foreign Application Priority Data

Apr. 17, 1992 [JP] Japan .................. 4-032391 U

[51] Int. Cl.⁶ .................................................. H01H 3/16
[52] U.S. Cl. .................. 200/61.3; 200/61.35; 200/61.54
[58] Field of Search .................... 200/4, 6 R, 6 A, 200/17 R, 61.27, 61.3, 61.31, 61.33, 61.34, 61.35, 61.36, 61.54

[56] References Cited

U.S. PATENT DOCUMENTS

| | | | |
|---|---|---|---|
| 3,609,264 | 9/1971 | Suzuki et al. | 200/61.34 |
| 3,914,566 | 10/1975 | Wendling | 200/61.27 |
| 4,351,991 | 9/1982 | Morita et al. | 200/61.27 |
| 4,365,121 | 12/1982 | Morita et al. | 200/61.27 |
| 4,571,469 | 2/1986 | Hanaki | 200/61.54 |
| 4,647,736 | 3/1987 | Furuhashi et al. | 200/61.27 |
| 4,855,542 | 8/1989 | Furuhashi et al. | 200/61.27 |
| 4,888,456 | 12/1989 | Suzuki | 200/61.27 |
| 5,030,802 | 7/1991 | Noro | 200/61.27 |

FOREIGN PATENT DOCUMENTS

| | | | |
|---|---|---|---|
| 49-13674 | of 1974 | Japan | B60Q 1/26 |
| 55-36285 | of 1980 | Japan | B60Q 1/40 |
| 56-116671 | of 1981 | Japan | G01P 13/04 |
| 56-7546 | of 1981 | Japan | B60Q 1/40 |
| 56-30522 | of 1981 | Japan | B60Q 1/40 |
| 56-75230 | of 1981 | Japan | B60Q 1/40 |
| 56-13162 | of 1981 | Japan | B60Q 1/40 |
| 1-156150 | of 1989 | Japan | B60Q 1/40 |
| 1214385 | 12/1970 | United Kingdom | B60Q 1/42 |
| 1389409 | 4/1975 | United Kingdom | H01H 21/50 |
| 1455242 | 11/1976 | United Kingdom | B60Q 1/42 |
| 1570337 | 6/1980 | United Kingdom | B60Q 1/42 |

*Primary Examiner*—Kristine L. Kincaid
*Assistant Examiner*—Michael A. Friedhofer

[57] ABSTRACT

A spring holder is engaged with a lower end portion of a cancel cam integrally rotatable with a steering shaft. A cam spring is interposed between the spring holder and a cancel cam. A lower end portion of the spring holder is supported on an upper side clip which secures a bearing supported around the steering shaft. When the cancel cam rotates integrally with the steering shaft, the upper side clip supporting the spring holder also rotates integrally with the steering shaft, and there is no sliding portion in the spring holder and the cam spring.

4 Claims, 3 Drawing Sheets

AUTO-CANCEL DEVICE

BACKGROUND OF THE INVENTION

1. Field of the Invention

The present invention relates to an auto-cancel device which is provided on a handle portion of an automobile and which allows a turning switch manually operated on cornering of the automobile to return automatically to a neutral position upon termination of the cornering of the automobile.

2. Description of Background Art

Various devices are known for example, as set forth in the Official Gazette under Utility Model Publication No. 49-13674 (13674/1974) in which a cancel cam is provided around a steering shaft, the cancel cam is biased by means of a cam spring to engage with a rotating member rotating integrally with the steering shaft, and a cancel pin is provided on a switch case to contact slidingly on a cam surface of the cancel cam. The switch case is mounted in a stationary manner around the steering shaft and is adapted to rotatably support an operating lever to be connected operatively with the cancel pin.

When the operating lever is rotated in a cornering direction, the cancel pin is moved by means of the operating lever that if the cancel cam rotates integrally with the steering shaft in the cornering direction, it allows such a movement, and that when the steering shaft and the cancel cam are reversed with termination of the cornering, it is displaced into a position in which it engages with the cancel cam and receives a force to return the operating lever to the neutral position.

SUMMARY AND OBJECTS OF THE INVENTION

In the prior art devices as mentioned above, the second end portion of the cam spring which urges the cancel cam at a first end portion is supported on the switch case. Accordingly, when the cancel cam rotates integrally with the steering shaft, because the second end of the cam spring slides on a resin portion of the switch, there occurs a problem wherein abnormal sounds are generated and rotary resistance of the steering shaft is increased. Also, though grease may be applied to avoid wear, in this case, the number of production steps is increased and thus the cost is increased. An object of the present invention is to solve such problems.

To solve the aforesaid problem, an auto-cancel device according to the present invention includes an operating lever and a cancel cam and further includes a cam spring wherein one end is supported on a cancel cam and the other end is supported on a rotating member which rotates integrally with a steering shaft other than the cancel cam.

Both ends of the cam spring are supported on the cancel cam rotating integrally with the steering shaft and on the other rotating member other than the cancel cam. Therefore, even if the cancel cam rotates integrally with the steering shaft, the cam spring also rotates integrally with the rotating members of both ends and does not slide between the stationary members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

One embodiment will be described with reference to FIG. 1 to FIG. 3.

DETAILED DESCRIPTION OF THE PREFERRED EMBODIMENT

Figure 2:
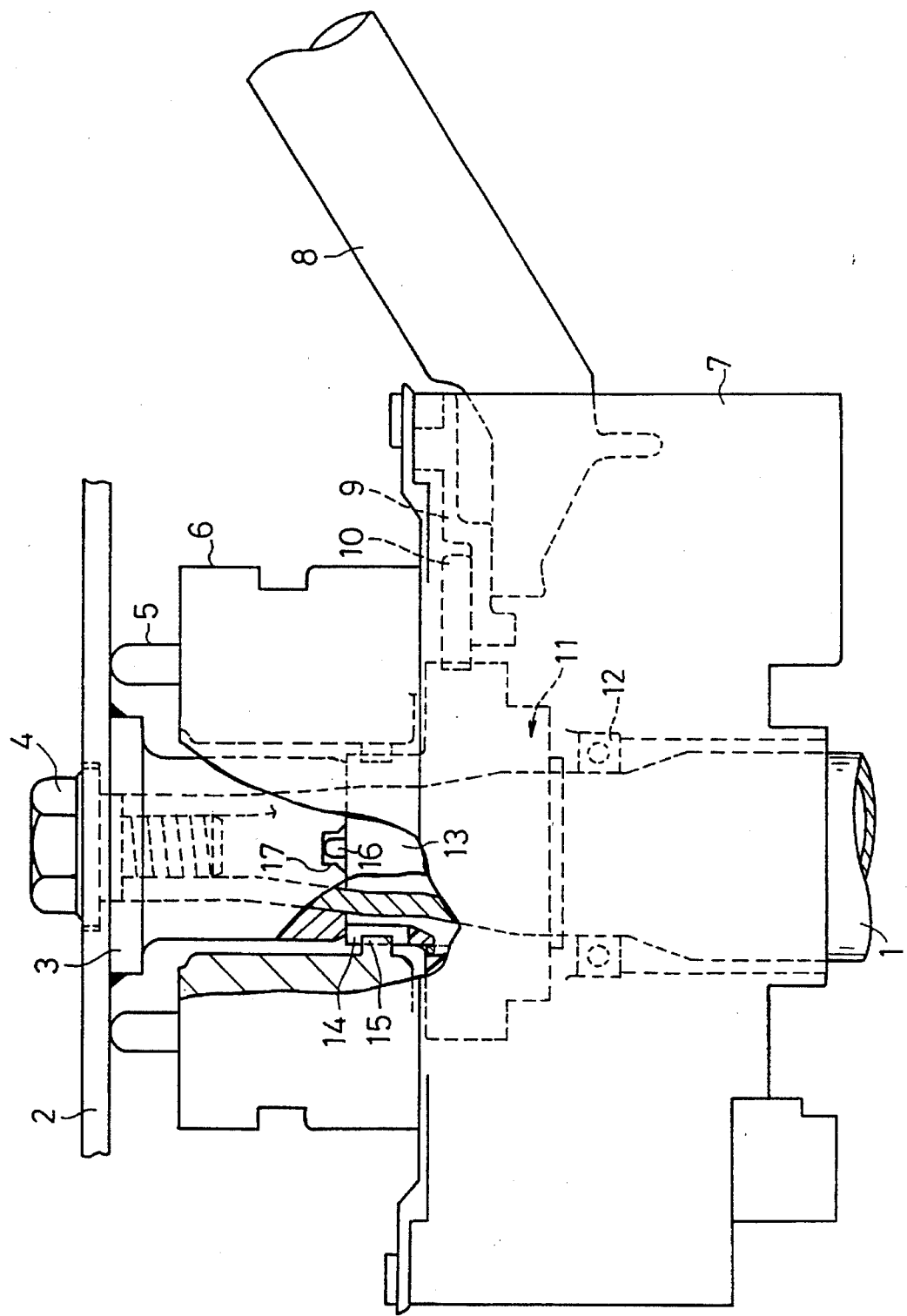
FIG. 2 shows a side view of an entire turning switch with an upper portion of a handle partially cut away.

As illustrated in FIG. 2, an upper portion of a steering shaft 1 is connected by means of a bolt 4 to a boss 3 which is welded to a central portion of a spoke 2 of a steering wheel, in order to be capable of rotating integrally with rotation of the steering wheel.

On a periphery of the steering shaft 1 is provided a cord reel 6 which is engaged with the spoke 2 and a pin 5. Accordingly, the cord reel 6 is also capable of rotating integrally with the steering wheel.

Beneath the cord reel 6 is provided a switch case 7 on the periphery of the steering shaft 1. In the switch case 7, a turning switch is formed to a right side as shown in FIG. 2. An operating lever 8 extends to the right. Further, an illuminating switch or the like is provided to a left side of the switch case 7 in FIG. 2. However, the illustration of the illuminating switch is omitted.

A pin operating portion 9 is provided on a leading portion inside the switch case 7, of the operating lever 8. A cancel pin 10 is provided to be limited in actuation by the pin operating portion. A leading end of the cancel pin 10 is adapted to slidingly contact with a cam surface of a cancel cam 11.

The cancel cam 11 is supported around the steering shaft 1, but does not slide to the switch case 7 which is supported stationarily around the steering shaft 1 through the intermediary of bearings 12 as described in detail hereinafter.

At an upper central portion of the cancel cam 11 a boss portion 13 projects upwardly around which a cutting groove 14 is formed from an upper side end. A projecting portion 15 formed on the cord reel 6 engages the cutting groove 14 whereby the cancel cam 11 rotates integrally with the cord reel 6.

Further, on an upper edge end of the boss portion 13 an engaging projection 16 is formed to project upwardly. This engaging projection 16 fits in a cut-away recess 17 formed in a lower edge end of the boss 3.

Figure 3:
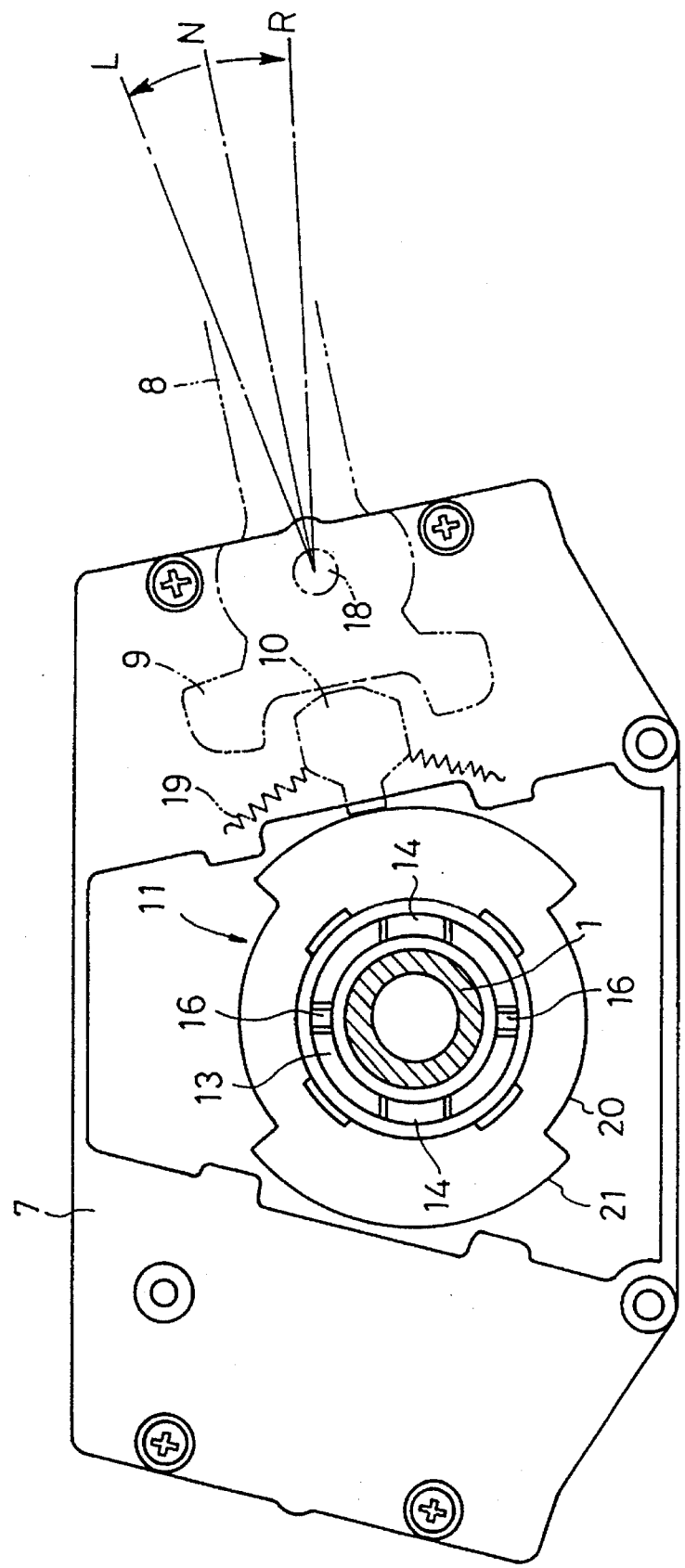
FIG. 3 shows a plan view of a switch case and a cancel cam.

As shown in FIG. 3, the operating lever 8 and the pin operating portion 9 are capable of rotating around a supporting shaft 18 by having the support shaft 18 as a center. The operating lever 8 rotates from its neutral position to a right turn position R or a left turn position L, with the cornering of the automobile. When the operating lever 8 rotates, the pin operating portion 9 also rotates, whereby any one of projecting portions formed on both sides of its leading end engages either the left or right side of the cancel pin 10.

The cancel pin 10 is biased in a direction of the cancel cam 11 by means of a return spring 19, and the leading end portion of the cancel pin 10 is capable of slidingly contacting to a smaller diameter portion 20 or a larger diameter portion 21 forming a cam surface of the cancel cam 11. The smaller diameter portion 20 and the larger diameter portion 21 are formed alternately generally every one/fourth of the circumference of the cancel cam 11.

Accordingly, when the operating lever 8 is in the neutral position N, because the cancel pin 10 does not engage with the pin operating portion 9, even if the cancel cam 11 is rotated in either the left or right direction, the cancel pin 10 only slidingly contacts the smaller diameter portion 20 or the larger diameter portion 21, and the cancel pin 10 and the pin operating portion 9 or the operating lever 8 have no relationship with each other.

Also, when the operating lever 8 is rotated, for example, up to the right turn position R with the right turn, because the left projection of the pin operating portion 9 engages with the left side, right lower side in FIG. 3 of the cancel pin 10, the right rotation, clockwise direction in FIG. 3, of the cancel cam 11 only vibrates instantaneously the cancel pin 10 at an angle portion changing from the smaller diameter portion 20 to the larger diameter portion 21 and there is no affect on the pin operating portion 9 and the operating lever 8.

Thereafter, by returning the steering wheel with a termination of the right turn, when the cancel cam 11 is rotated in the left direction, counterclockwise direction in FIG. 3, since the cancel pin 10 is pushed at the angle portion changing from the smaller diameter portion 20 to the larger diameter portion 21, of the cancel cam 11 and at the same time, the pin operating portion 9 engaging with the cancel pin is pushed, the operating lever 8 together with the pin operating portion 9 is adapted to return at the neutral position N.

The following description is directed to a further detailed discussion of the cancel cam 11. As is apparent in FIG. 1, the cancel cam 11 is of a stepped, cylindrical body on which the boss portion 13, the smaller diameter portion 20 and the larger diameter portion 21, and a cylindrical spring holder 22 are superposed beneath the cancel cam 11, both engaging each other.

A cam spring 23 is interposed between the cancel cam 11 and the spring holder 22. The cam spring 23 biases the cancel cam 11 and the spring holder 22 in a direction away from each other. However, the cam spring 23 acts to upwardly bias the cancel cam 11 as described hereinafter.

An upper end portion of the cam spring 23 is fitted into a recess 25 which is formed at a lower end portion of the boss portion 13. A base of an annular wall 24 is formed on an outer peripheral side to extend downwardly. A lower end portion of the cam spring 23 is supported on a root portion of an engaging projection 26 which is formed on an upper outer periphery of the spring holder 22 to extend radially. The engaging projection 26 engages into a groove 27 cut in an upwardly direction from a lower edge end of the annular wall 24. The cancel cam 11 is capable of rotating integrally with the spring holder 22.

The lower end portion of the spring holder 22 abuts and is supported on an upper side clip 28 which secures a bearing 12 around the steering shaft 1. Also, an inner race 30 of the bearing 12 contacts around the steering shaft 1, and an outer race 31 of the bearing 12 is supported on an upright wall portion 32 forming a portion of the switch case 7.

Figure 1:
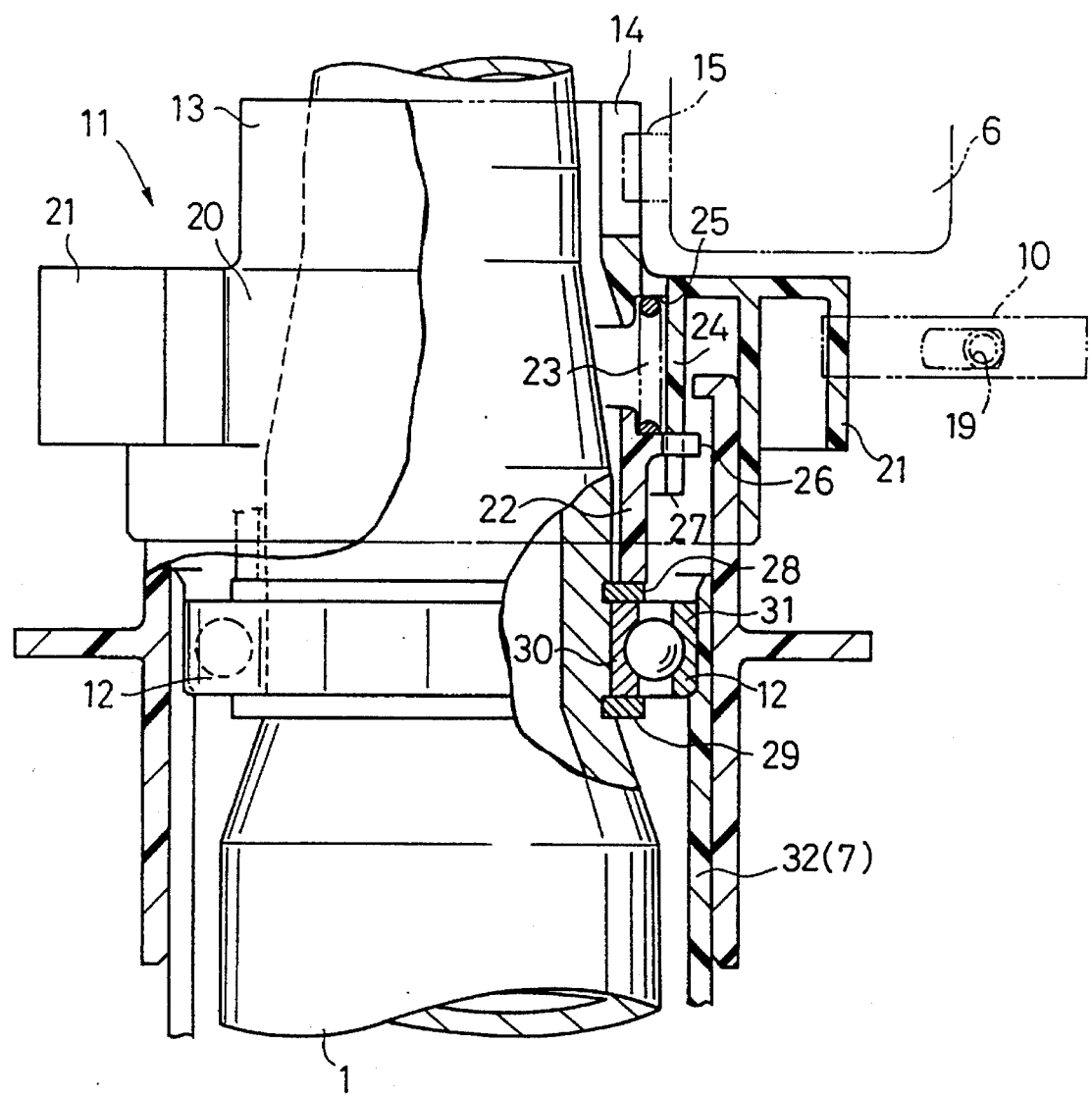
FIG. 1 illustrates a partially cut-away side view of a cancel cam portion according to the embodiment.

The following description is provided concerning the operation of the present embodiment. In FIG. 1, since the upper and lower portions of the cam spring 23 are interposed between the cancel cam 11 and the spring holder 22, and the lower end portion of the latter is supported by the upper side clip 28, the cam spring 23 is biasing the cancel cam 11 upwardly. In this condition when the steering shaft 1 rotates, the cam spring 23 also rotates integrally with the cancel cam 11 and the spring holder 22.

Accordingly, the lower end portion of the cam spring 23 does not slide relative to the spring holder 22. Also, the lower end portion of the spring holder 22 does not slide relative to with the upper side clip 28 with rotation of the cancel cam 11, because the upper side clip 28 rotates integrally with the steering shaft 1.

Therefore, the cancel cam 11, the spring holder 22 and cam spring 23 do not have a movement between them. For this reason, a problem of the prior art is avoided in that abnormal sounds generated by the rotation of the steering wheel wherein the rotation becomes restrained are avoided.

Moreover, since it is unnecessary to apply grease in order to avoid wear in the spring holder 22 and the cam spring 23, the number of production steps is reduced which makes it possible to reduce the cost of manufacturing.

Further, the present invention is not limited to the aforesaid embodiment, and various modifications and applications are possible, for example, the spring holder 22 may be omitted and the lower end portion of the cam spring 23 may contact directly with the upper side clip 28. Also, the member supporting the spring holder 22 or the lower end portion of the cam spring 23 is not limited to the upper side clip 28, and it is possible to be suitably utilized if the member rotates integrally with the steering shaft.

The auto-cancel device relating to the present invention has been made to support the one end of the cam spring on the cancel cam, and to support the other end on the member other than the cancel cam at said rotating member. Therefore, when the cancel cam rotates integrally with the steering shaft, since the cam spring can rotate integrally with the rotating member of both ends, it is possible to not slide between the stationary members. For this reason, it is possible to prevent the abnormal sounds from generating upon rotation of the steering shaft and to prevent the rotation from becoming restrained.

Further, since it is unnecessary to apply grease in order to avoid wear in the sliding portions between the cam spring and the stationary member side, the number of production steps is reduced for construction and thus, it is possible to reduce the cost of manufacturing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An auto-cancel device for permitting a manually operated turning switch to automatically return to a neutral position upon termination of a turn comprising:

a non-rotatable fixed housing for rotatably mounting a steering shaft;

a cancel cam operatively positioned within said housing and being secured to said steering shaft to rotate together therewith;

an operating lever including a first end rotatably mounted on a support shaft operatively disposed within said housing and a second end projecting from said housing;

a cancel pin operatively positioned between said first end of said operating lever and said cancel cam;

said turning switch being disposed within said housing and being manually operated upon actuation of said operating lever in a direction to indicate a right turn and a left turn;

wherein manually actuating said operating lever imparts movement to said cancel pin for actuating said turning switch and termination of a turn imparts movement to said cancel cam for actuating said operating lever to return to a neutral position; and a spring holder operatively disposed adjacent to said steering shaft, a bearing mounted between said spring holder and said housing, and a cam spring interposed between said spring holder and said cancel cam for biasing said cancel cam and said spring holder in a direction away from each other;

wherein said cancel cam, said spring holder and said cam spring do not move rotationally relative to one another thereby avoiding frictional noise therebetween.

2. The auto-cancel device according to claim 1, wherein said first end of said operating lever includes a pin operating portion for engaging said cancel pin for imparting movement thereto during manual actuation of said operating lever.

3. The auto-cancel device according to claim 1, and further including a return spring operatively connected to said cancel pin and said housing for biasing said cancel pin into engagement with said cancel cam.

4. The auto-cancel device according to claim 1, wherein said cancel cam includes an outer peripheral surface divided into first, second, third and fourth areas wherein the first and third areas project a greater distance from a center point of said cancel cam relative to the second and fourth areas and all of the first, second, third and fourth areas providing a cam surface for engagement by said cancel pin during rotation of said cancel cam upon rotation of said steering shaft.

\* \* \* \* \*